United States Patent [19]
Eguchi et al.

[11] Patent Number: 6,126,176
[45] Date of Patent: Oct. 3, 2000

[54] FALL SUPPRESSING DEVICE FOR A VEHICLE CONFIGURED TO RIDE ON DESCENDING AND ASCENDING ESCALATORS

[75] Inventors: Yasuhiko Eguchi; Toru Kakehi, both of Neyagawa; Heiji Fukutake, Toyonaka, all of Japan

[73] Assignee: Exedy Corporation, Osaka, Japan

[21] Appl. No.: 09/144,981

[22] Filed: Sep. 1, 1998

[30] Foreign Application Priority Data

Sep. 8, 1997 [JP] Japan .................................. 9-243084
Sep. 8, 1997 [JP] Japan .................................. 9-243087

[51] Int. Cl.⁷ ................................. B62B 5/02; B62B 5/04
[52] U.S. Cl. ....................... 280/5.2; 280/5.26; 280/47.34; 280/33.994
[58] Field of Search ........................... 280/DIG. 10, 5.2, 280/5.22, 5.24, 5.26, 5.28, 5.32, 47.34, 37, 304.1, 304.5, 33.992, 33.994, 33.997, 33.991; 198/321, 326; 180/8.2

[56] References Cited

U.S. PATENT DOCUMENTS

| 3,269,478 | 8/1966 | Josyln ........................................ 280/5.3 |
| 4,061,199 | 12/1977 | Last ........................................... 180/8.2 |
| 4,132,423 | 1/1979 | Chant ......................................... 180/8.2 |
| 4,326,622 | 4/1982 | Ellzey ...................................... 280/5.28 |

FOREIGN PATENT DOCUMENTS

| 2 714 007 A1 | 12/1993 | France . |
| 2714007 | 6/1995 | France . |
| 6751057 | 1/1969 | Germany . |
| 6937384 | 9/1969 | Germany . |
| 2030594 | 12/1971 | Germany . |
| 2030583 | 1/1972 | Germany . |
| 8133435 | 4/1982 | Germany . |
| 19506847 | 9/1996 | Germany . |
| 0 774 398 A1 | 5/1997 | Germany . |

*Primary Examiner*—Peter C. English
*Assistant Examiner*—Ruth Ilan
*Attorney, Agent, or Firm*—Shinjyu Global IP Counselors, LLP

[57] ABSTRACT

A fall suppressing device 8 provided in a cart for moving up and down an escalator includes an engagement member 87 and an oil damper 81. The engagement member 87 is vertically movably coupled to the cart, and engages with an upper step when a wheel 5 falls from the upper step. The oil damper 81 damps a relative moving speed between a cart body and the engagement member 87.

16 Claims, 17 Drawing Sheets

FALL SUPPRESSING DEVICE FOR A VEHICLE CONFIGURED TO RIDE ON DESCENDING AND ASCENDING ESCALATORS

BACKGROUND OF THE INVENTION

A. Field of the Invention

The invention relates to a fall suppressing device for use on a vehicle that is configured for riding on descending and ascending escalators, and more particularly to a fall suppressing device for a cart which is moved onto steps of an escalator, for example in an airport, and then rides up or down on steps of the escalator.

B. Description of the Background Art

In large transportation centers, such as airports, handcarts or pushcarts are usually provided for transporting large pieces of luggage such as suitcases and duffle bags. Travelers put their luggage on the carts when moving around the airport. Since there are many escalators in airports, it is very convenient if persons using the carts can move up or down on the escalator together with their carts.

However, in a middle section of the escalator, the inclination of the escalator is a maximum and there is a large level or height difference between adjacent steps. Therefore, the cart on an inclined section of the escalator move due to the forces of gravity and may begin to move with respect to the escalator and fall if the cart is not adequately positioned on the escalator. Such movement of the cart is difficult to avoid given the inclined structure of the escalator.

As a manner for preventing fall of the cart, the cart may be equipped with a fall suppressing member which can contact one or more steps of the escalator when the cart becomes inclined on the escalator. If wheels of the cart are on rear edges of the steps, the cart may fall from the steps when inclined. Even in this case, however, the fall suppressing member eventually will contact a neighboring lower step and thereby should prevent further movement.

The cart provided with such an fall suppressing member is disclosed in Japanese Laid-Open Utility Model Publication No. 6-60576 (1994).

Even in the above cart provided with the fall suppressing member for suppressing continuous falling, it is desirable to suppress the falling more reliably for improving the safety. For this purpose, it is advantageous to provide the cart a means for braking when it is on the escalator.

As can be seen from the cart disclosed in Japanese Laid-Open Utility Publication No. 6-60576, the cart in the airport is generally provided with a brake which is controlled by a vertical motion of a cart handle. When the handle returns to a vertically middle position or is released, the brake is applied. When the handle is moved upward or downward, the brake is released. After moving the cart onto the escalator, therefore, an operator must return the handle to the middle position or must release the handle to apply the brake, which was released when the cart was not on the escalator.

However, it is unavoidable that the cart falls onto the neighboring step due to the structure of the escalator. When falling, the operator often tends to hold unconsciously the cart handle. As a result, the handle may be moved upward or downward from the middle position, and thereby the brake may be released. Particularly on the escalator, the cart is inclined, and therefore it is difficult to keep the brake engaged when continuously holding and maintaining the handle at the middle position.

If the cart is inclined on the up escalator, the handle moves toward the operator. If it is inclined on the escalator as it moves downward, the handle moves away from the operator. In these cases, the operator must move on the steps, and therefore the brake is liable to be released unless the operator releases the handle.

SUMMARY OF THE INVENTION

An object of the invention is to provide a cart with means for restricting movement of the cart when riding a moving escalator and further suppress movement of baggage when the cart does move relative to the moving escalator.

In accordance with one aspect of the present invention, a fall suppressing device for a vehicle that is configured to ride on ascending and descending escalators, includes an engagement member supported on the vehicle. The engagement member is moveable in a vertical direction with respect to the vehicle and is configured for engagement with an upper step of the escalator in response to a wheel of the vehicle falling from an upper step of the escalator to a lower step of the escalator. A damper is connectable to the vehicle and to the engagement member for damping relative movement between the vehicle and the engagement member.

Preferably, the fall suppressing device further includes an arm coupling the engagement member to the vehicle such that the engagement member is movable relatively to the vehicle along an arc-shaped path around a joint defined on the arm and the vehicle.

In accordance with another aspect of the present invention, a cart configured to ride on ascending and descending escalators after being moved onto the escalator, includes a cart body and a plurality of wheels supported at lower portions of the cart body. A fall suppressing device has a first engagement member and a damper. The first engagement member is coupled to the cart body proximate a rearward side of at least one of the wheels for pivotal movement with respect to the cart body. The first engagement member is biased into a position that is slightly spaced from a floor with the wheels in generally level contact with the floor. The damper is operable between the cart body and the first engagement portion for dampening movement of the first engagement portion with respect to the cart body.

Preferably, the cart further includes a first arm pivotally mounted to the cart body. The first engagement member is fixed to a distal end of the first arm such that the first engagement member is movable relatively to the cart body along an arc-shaped path defined by pivotal movement of the first arm with respect to the cart body.

Preferably, the fall suppressing device further includes a second engagement member, the second engagement member being coupled to the cart body proximate a forward side of the at least one of the wheels for pivotal movement with respect to the cart body. The second engagement member is biased into a position that is slightly spaced from the floor with the wheels in generally level contact with the floor. The damper is operable between the cart body and the second engagement portion for dampening movement of the second engagement portion with respect to the cart body.

Preferably, movement of the first and second engagement members are interlocked such that movement of the first engagement member causes the second engagement member to undergo corresponding movement.

In accordance with another aspect of the present invention, a cart configured to ride on ascending and descending escalators after being moved onto the escalator, includes a cart body and front wheels and rear wheels supported at lower portions of the cart body. A front-wheel-fall suppressing device includes a first arm and a second arm. The first arm is coupled to the cart body proximate a rearward side of one of the wheels for pivotal movement with respect to the cart body and the second arm is coupled to the cart body proximate a forward side of the one of the front wheels for pivotal movement with respect to the cart body. A first engagement member is fixed to a distal end of the first arm and a second engagement member fixed to a distal end of the second arm. A damper has a first end fixed to the cart body proximate the one of the front wheels and the first and second engagement members are biased into a position that is slightly spaced from a floor with the front and rear wheels in generally level contact with the floor. The damper is operable between the cart body and the first and second engagement members for dampening movement of the first engagement portion with respect to the cart body. The first and second engagement members are interlocked such that movement of the first engagement member causes the second engagement member to undergo corresponding movement.

Preferably, the cart further includes a rear-wheel-fall suppressing device having a third arm fixed to the cart body. A third engagement member is fixed to a distal end of the third arm and a second damper is fixed to the cart body and an other end of the third arm. The third arm is located at rearward side of one of the rear wheels and the third engagement member is spaced apart from the floor with the front and rear wheels in generally level contact with the floor. The second damper is configured to dampen relative movement between the third engagement member and the cart body.

Preferably, the cart further includes a second rear-wheel-fall suppressing device and a second front-wheel-fall suppressing device, the rear-wheel-fall suppressing device and the front-wheel-fall suppressing device being disposed on a first side of the cart body and the second rear-wheel-fall suppressing device and the second front-wheel-fall suppressing device being disposed on a second side of the cart body.

Preferably, a distance between the front and rear wheels is substantially equal to a multiple of a span between adjacent steps of the escalator.

In accordance with yet another aspect of the present invention, a cart to be moved up or down by an escalator after being moved onto the escalator includes a cart body and a plurality of wheels arranged at a lower portion of the cart body. A fall suppressing device has first and second engagement members and a damper. The first and second engagement members are supported on the cart body at rearward side of one of the wheels and in front of the one of the wheels, respectively. The first and second engagement members are spaced apart from a floor with the wheels in generally level contact with the floor. The engagement members are movable with respect to the cart body. The first and second engagement members are interlocked such that movement of the first engagement member causes the second engagement member to undergo corresponding movement. The damper is configured to dampen the movement of the first and second engagement members, and a predetermined space is maintained between the cart body and the escalator with the cart body riding on the escalator.

Preferably, the cart body further includes a lower member and a carrier for carrying baggage, the lower member of the cart body also serving as a lower member of the carrier.

Preferably, the lower member includes an inclined portion inclined upward when viewing the cart body on a horizontal plate from a rear side thereof.

When the cart of the present invention is moved onto the moving steps of an escalator and starts falling from an upper step to a lower step, the engagement member first engages with the upper step. The engagement member firmly engages the step since it is made of a friction producing material, such as rubber. The vehicle will continue falling with the engagement member engaging the upper step. After the engagement member engages with the upper step, the damper damps the relative movement between the vehicle and the engagement member so that the falling speed of the vehicle is slow and even. This reduces uneasiness and fear which may be felt by an operator of the cart. Also, a shock caused by the wheel of the vehicle touching the lower step is reduced so that a shock acting on baggage and others on the vehicle can be suppressed. Therefore, shifting and falling of the baggage or the like on the cart can be suppressed.

In the above invention, the engagement member supported by the arm moves relatively to the vehicle along the arc-shaped path around the joint between the arm and the vehicle body or cart body. Therefore, the falling motion of the vehicle after engagement of the engagement member with the upper step contains a circular motion in contrast to the cases of mere falling and mere sliding. Accordingly, the operator of the vehicle feels that the current falling motion is a predetermined and expected motion, and this suppresses uneasiness which may be experienced by the operator as the cart falls.

The present invention is configured such that when the operator pushes and moves the cart on an ordinary horizontal floor, only the wheels are on the floor and the first engagement member is spaced from the floor. Therefore, the first engagement member does not impede the movement of the cart on a horizontal surface.

According to the present invention, the cart further has such a feature that the fall suppressing device further has a second engagement member. Movement of the second engagement member coupled movement of the first engagement member so when one engagement member is acting to dampen movement of the cart, the other engagement member is being moved out of the way so that it does not interfere with the action of the dampening.

When the wheel of the cart on the up escalator starts to fall from an upper step to a neighboring lower step, the second engagement member engages with the upper step. The cart body continues falling with the second engagement member engaging with the upper step. After the second engagement member engages with the step, however, the damper damps the relative moving speed between the cart body and the second engagement member so that the falling speed of the cart body decreases. This reduces uneasiness and fear felt by the operator of the cart. Also, a shock caused by the wheel of the cart touching the neighboring lower step is reduced so that a shock against the baggage on the cart is reduced. Therefore, shifting and falling of the baggage can be suppressed.

When the front and rear wheels of the cart on the down escalator start to fall from upper steps to neighboring lower steps, the first and third engagement members engage with the upper steps, respectively. The cart body continues falling with the first and third engagement members engaging with the upper step. After the first and third engagement members engage with the steps, however, the first damper damps the relative moving speed between the cart body and the first engagement member, and the second damper damps the relative moving speed between the cart body and the third engagement member so that the falling speed of the cart body decreases. This reduces uneasiness and fear which may be caused in an operator (user) of the cart by falling of the cart on the down escalator. Also, a shock caused by the front and rear wheels of the cart touching the neighboring lower steps is reduced so that a shock against the baggage on the cart is reduced. Therefore, shifting and falling of the baggage can be suppressed.

When the front wheel of the cart on the up escalator starts to fall from the upper step to the neighboring lower step, the second engagement member engages with the upper step. The cart body continues falling with the second engagement member engaging with the upper step. After the second engagement member engages with the step, however, the first damper damps the relative moving speed between the cart body and the second engagement member so that the falling speed of the cart body decreases. This reduces uneasiness and fear which may be caused in the operator of the cart on the up escalator by falling of the cart. Also, a shock caused by the front and rear wheels of the cart touching the lower steps is reduced so that a shock against the baggage on the cart is reduced. Therefore, shifting and falling of the baggage can be suppressed.

If the designed distance between the front and rear wheels is independent of the span between the steps of the escalator, a difference occurs between the time when the first engagement member engages with the step after start of falling of the front wheel and the time when the third engagement member engages with the step after start of falling of the rear wheel. If this difference in time occurs, the cart moves in a complicated manner, which increases uneasiness of the operator of the cart.

In the present invention, however, the distance between the front and rear wheels is substantially equal to a product of the span between the steps of the escalator and a natural number. Therefore, the front wheel starts falling when the rear wheel starts falling, and the first and third engagement members engage with the respective steps substantially at the same time. Therefore, the cart can fall in a simple manner, which suppresses uneasiness of the cart operator.

In the present invention, the cart body partially serves also as a portion of the structure of the carrier in contrast to a prior art in which the cart body and the carrier are completely independent of each other. This simplifies the structure and facilitates assembling process, and the number of parts and the cost can be reduced.

Since the lower member of the carrier is inclined upward when viewed from the rear side, moving, shifting and falling of baggage can be suppressed particularly when the cart inclines on the down escalator.

The foregoing and other objects, features, aspects and advantages of the present invention will become more apparent from the following detailed description, when taken in conjunction with the accompanying drawings.

DESCRIPTION OF THE PREFERRED EMBODIMENTS

Figure 1:
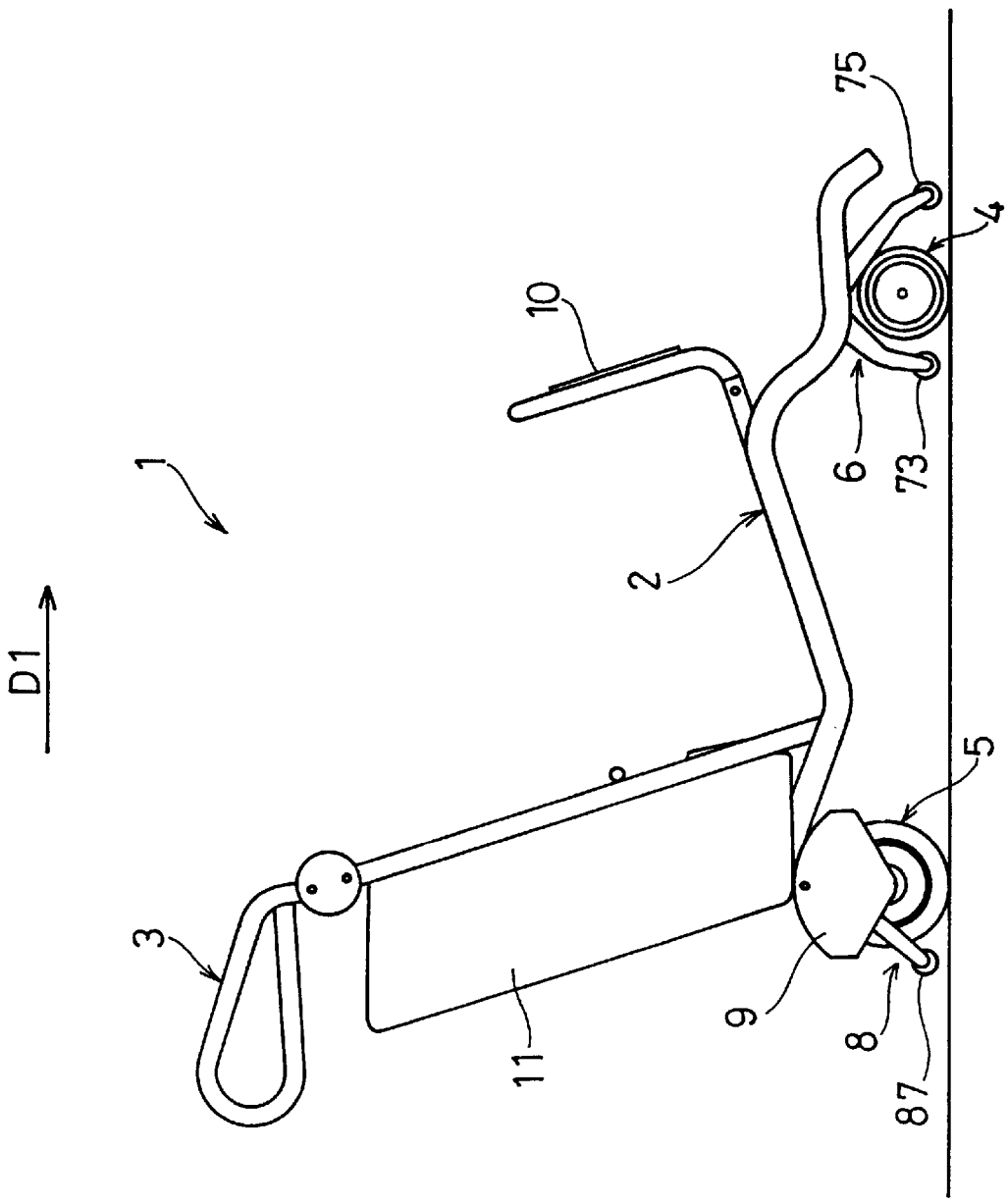
FIG. 1 is a side view of a cart in accordance with one embodiment of the present invention.

FIG. 1 shows a cart for an airport of an embodiment of the invention. The cart 1 is used for carrying and transporting baggage such as suitcases in the airport. The cart 1 is primarily formed of a cart body 2, a handle 3, a front wheel 4, two rear wheels 5, a front-wheel-fall suppressing device 6, rear-wheel-fall suppressing devices 8 each combined with the rear wheel 5, an automatic brake mechanism and a manual brake mechanism. An arrow D1 in FIG. 1 indicates a forward moving direction of the cart 1.

In the following description, longitudinal and lateral are directions that are defined based on the moving direction D1. specifically, lateral indicates horizontal directions that are generally perpendicular to the direction D1 and longitudinal indicates horizontal directions generally parallel to the direction D1.

A longitudinal distance (i.e., a wheel base) between the front and rear wheels 4 and 5 is, in this example, 800 mm and is equal to double the pitch of steps of an escalator. A lateral distance between the two rear wheels 5 is 600 mm, and an entire length of the cart 1 including the handle 3 is 1300 mm. The cart 1 is designed for the escalator of the specification of 25 degrees and R5000. The above dimensions are a specific escalator configuration. However, it should be understood that other dimensions and dimensional relationships are possible in applying the present invention. The above dimensions are just one example of the present invention.

Figure 2:
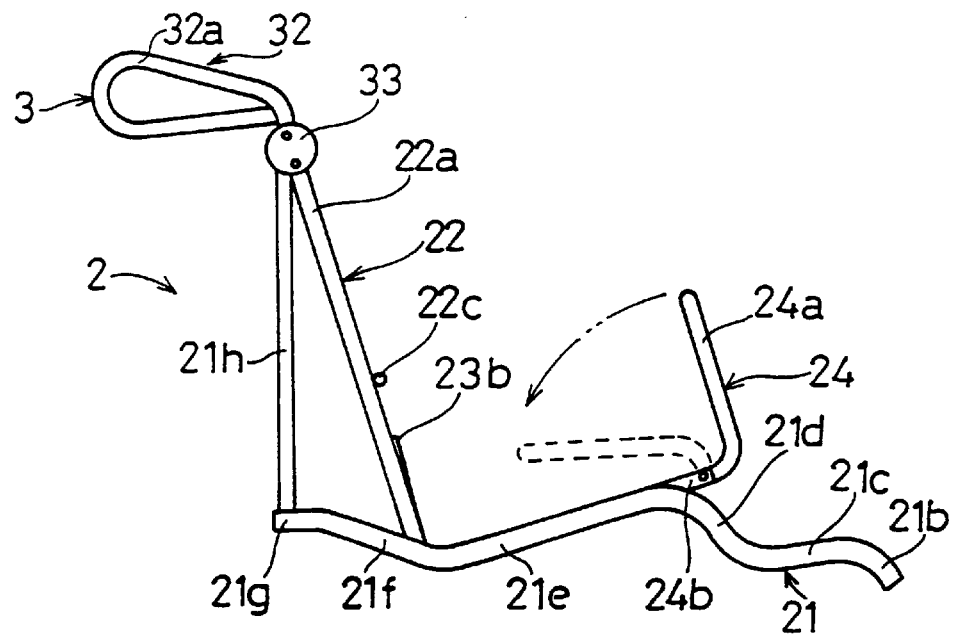
FIG. 2 is a side view of a body of the cart depicted in FIG. 1, and a handle extending from the body of the cart.
Figure 3:
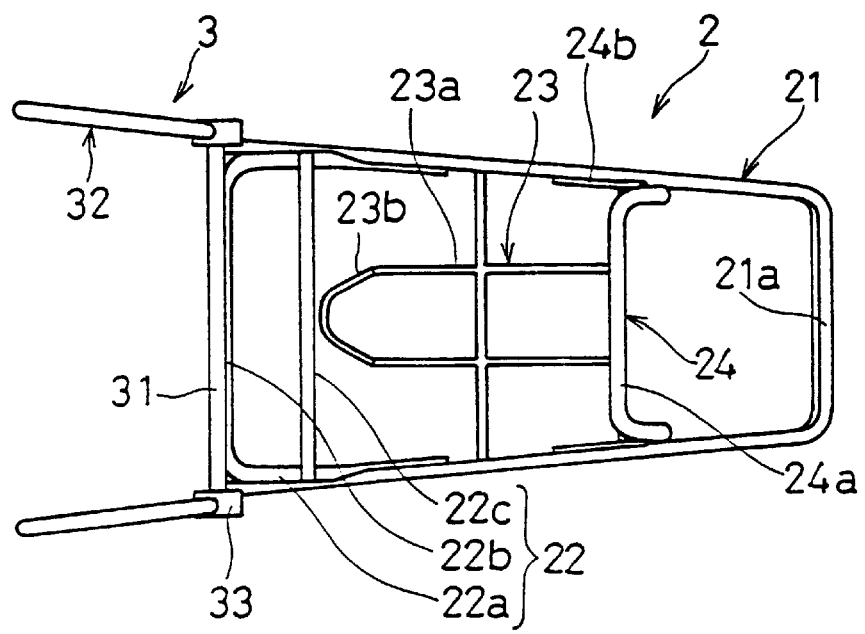
FIG. 3 is a top view of the body of the cart and the handle.
Figure 4:
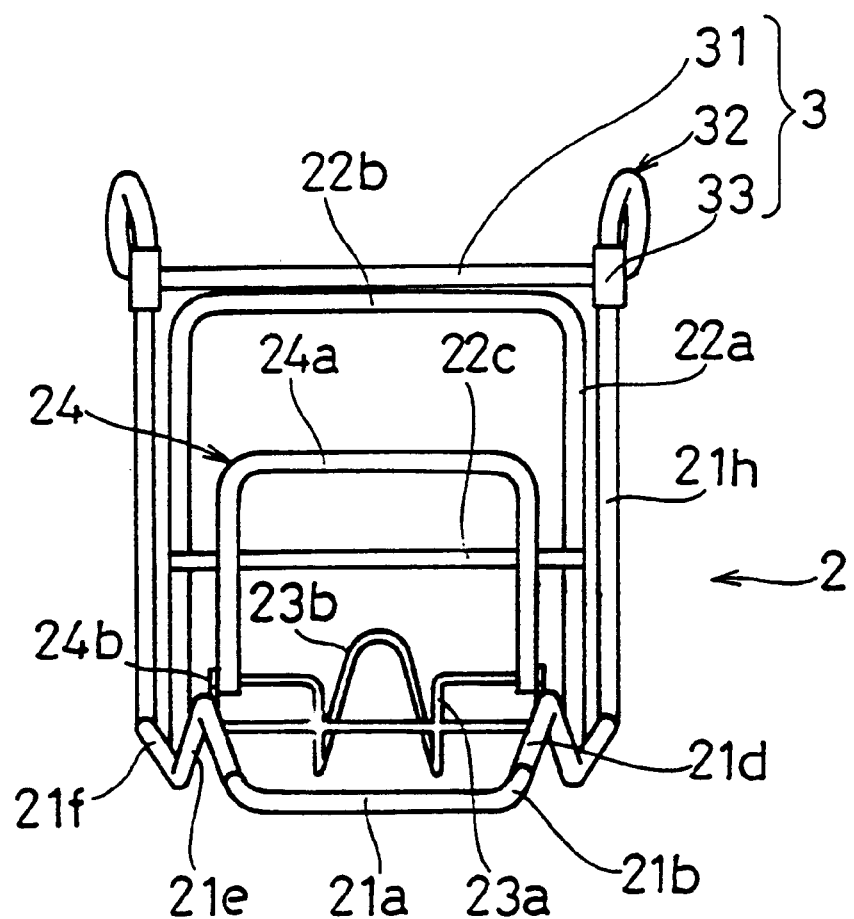
FIG. 4 is an elevation front view of the body of the cart and the handle.

As shown in FIGS. 2, 3 and 4, the cart body 2 is basically formed of a main frame 21, a carrier rear frame 22, a carrier lower frame 23 and a carrier front frame 24.

The main frame 21 is formed of first and second horizontal portions 21a and 21g, and first, second, third, fourth and fifth inclined portions 21b, 21c, 21d, 21e and 21f, and vertical portions 21h. The first horizontal portion 21a extends laterally in the front end of the cart 1. The first through fifth inclined portions 21b–21f extend and diverge rearward from the opposite ends of the first horizontal portion 21a. The first inclined portions 21b extend rearward and upward from the lateral ends of the first horizontal portion 21a, respectively. Each second inclined portion 21c extends rearward and slightly downward from the rear end of the corresponding first inclined portion 21b. Each third inclined portion 21d extends rearward and upward from the rear end of the corresponding second inclined portion 21c. Each fourth inclined portion 21e extends rearward and downward from the rear end of the corresponding third inclined portion 21d. Each fifth inclined portion 21f extends rearward and upward from the rear end of the corresponding fourth inclined portion 21e. Each second horizontal portion 21g extends longitudinally and rearward from the rear end of the corresponding fifth inclined portions 21f. The vertical portions 21h extend upward from the upper surface of the second horizontal portion 21g.

The carrier rear frame 22 is formed of side pillars 22a as well as first and second supports 22b and 22c. Each side pillar 22a is fixed at its lower end to the main frame 21, and extends upward and rearward from a front portion of the corresponding fifth inclined portion 21f. The side pillars 22a and the vertical portions 21h carry side display plates 11 for displaying, e.g., advertisements (see FIG. 1). The first support 22b connects the upper ends of the side pillars 22a together. The second support 22c couples the middle portions of the side pillars 22a together.

The carrier lower frame 23 is formed of a bottom support 23a and a rear support 23b. The bottom support 23a is formed of longitudinally extending round bars and lateral round bars, and are fixed to both the third inclined portions 21d and both the fourth inclined portions 21e. The rear support 23b extends upward and rearward from the rear end of the bottom support 23a.

The carrier front frame 24 is formed of a front support 24a and fixed portions 24b. The fixed portions 24b are fixed to the fourth inclined portions 21e, respectively. The front support 24a substantially has an inverted U-shaped form, and is carried on the fixed portions 24b via hinges provided with springs. The front support 24a is pivotable with respect to the fixing portions 24b, and can move to a position depicted by dotted line in FIG. 2. The front support 24a carries a front display plate 10 for displaying advertisements or the like as shown in FIG. 1.

The handle 3 is formed of couplings 33 fixed to the main frame 21 as well as first and second handle portions 31 and 32. The couplings 33 are fixed to the upper ends of the right and left vertical portions 21h, respectively. The first handle portion 31 couples the opposite couplings 33 together and extends laterally and horizontally. Each second handle portion 32 extends rearward from the corresponding coupling 33, and substantially has an oblong or elliptic form having an expanded rear portion. More specifically, each second handle portion 32 has an upper portion 32a which extends rearward and upward. For the embodiment depicted in FIG. 1, the distance from the floor to the upper end of the handle 3 is 950 mm, and a lateral distance between the opposite second handles 32 is 700 mm.

The front wheel 4 is formed of a double caster, and more specifically is formed of a fixed portion 4a and two tires 4b. The front wheel 4 is carried on a support plate 61 which is described in greater detail below, and is pivotable around a vertical axis with respect to the cart body 2.

Figure 5:
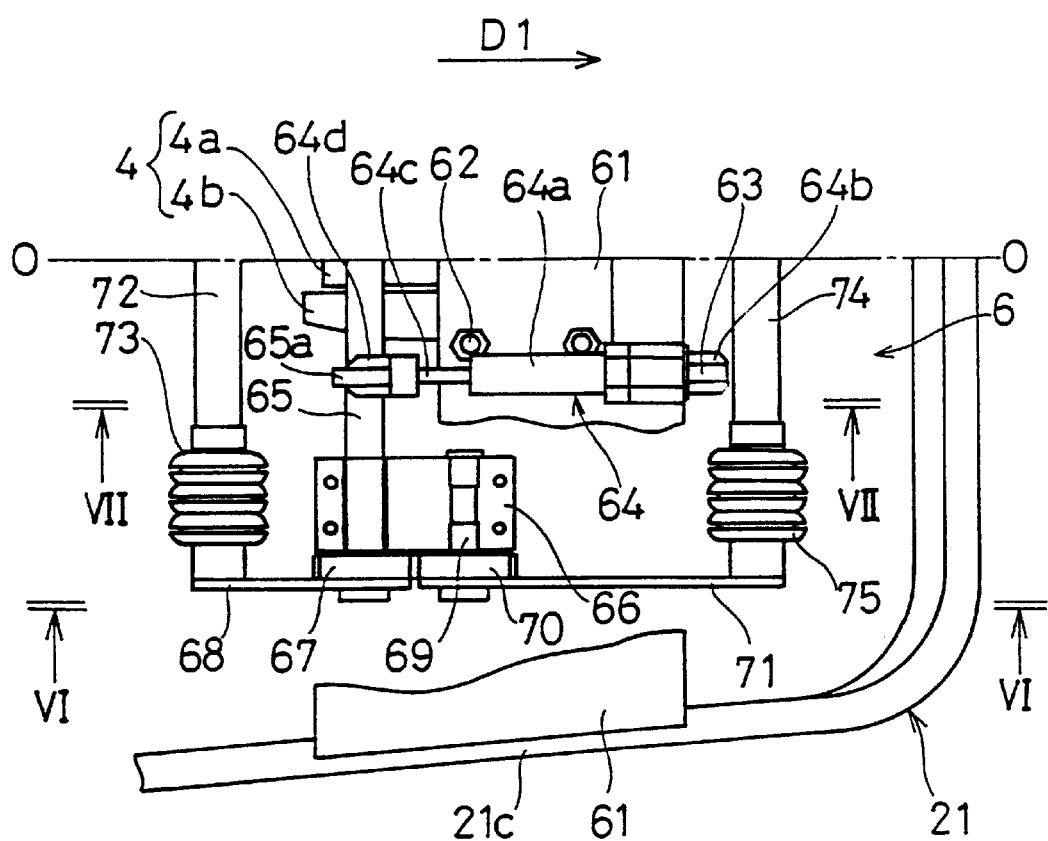
FIG. 5 is a top view of a front wheel of the cart depicted in FIGS. 1–4 showing a front-wheel-fall suppressing device.
Figure 6:
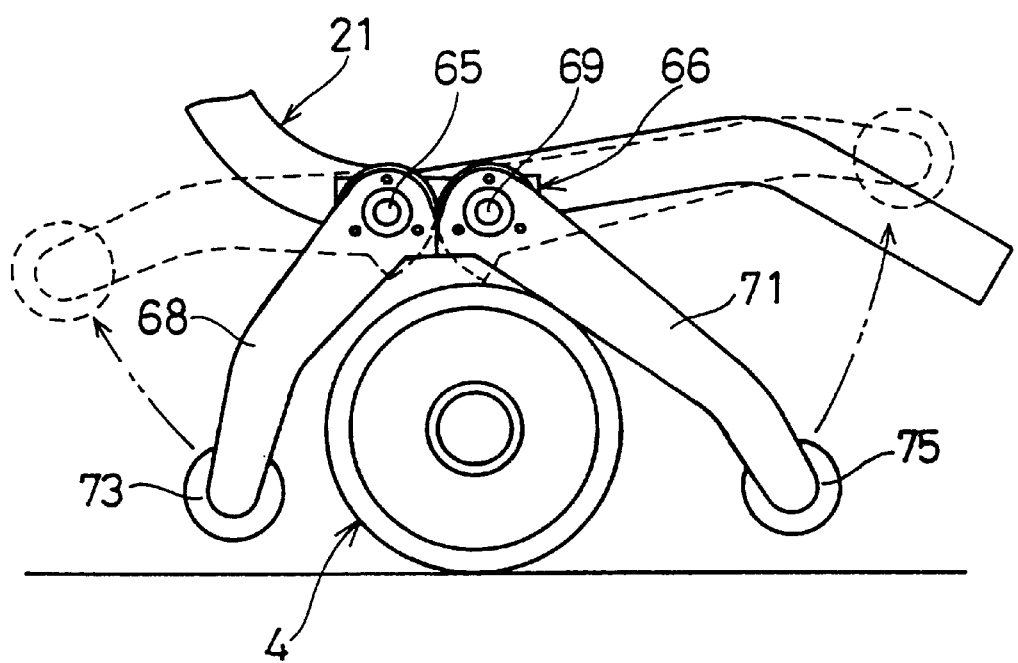
FIG. 6 is a view taken along line VI—VI in FIG. 5.
Figure 7:
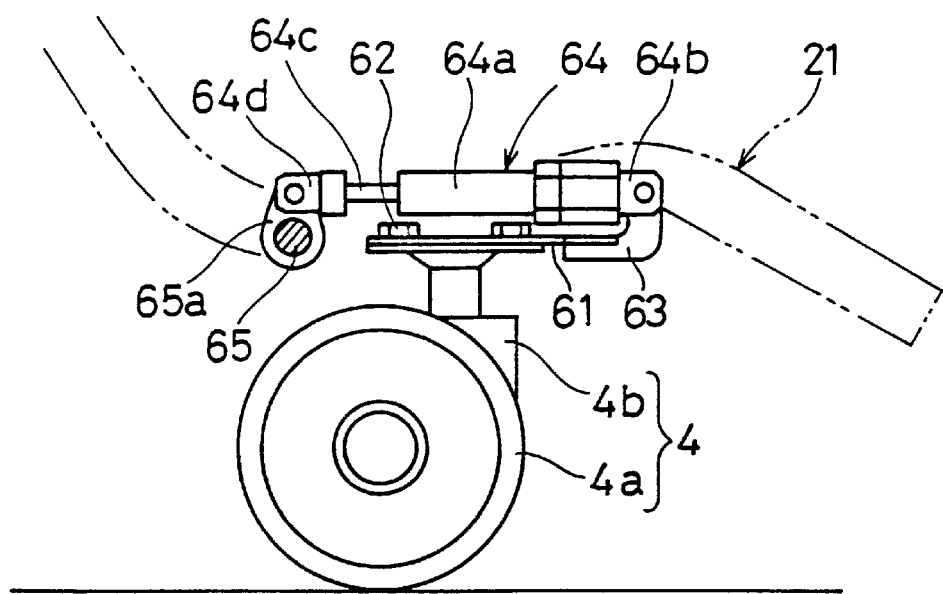
FIG. 7 is a view taken along line VII—VII in FIG. 5.

The front-wheel-fall suppressing device 6 is basically formed of, as shown in FIGS. 5–7, the support plate 61, two first oil dampers 64, a first shaft 65, first and second arms 68 and 71, and first and second engagement members 73 and 75.

The support plate 61 is fixed at its opposite ends to the second inclined portions 21c, but is partially cut away in FIG. 5 to more clearly show details of the front-wheel-fall suppressing device 6. The front wheel 4 is arranged under the center (O—O) of the support plate 61, and the fixed portion 4a of the front wheel 4 is fixed to the support plate 61 by bolts 62. Two coupling plates 63 extend upward from the front end of the laterally middle portion of the support plate 61. The coupling plates 63 are symmetrical with respect to the center axis O—O, and are fixed to the support plate 61. The coupling plates 63 are provided with apertures.

There are two first oil dampers 64 are disposed at laterally symmetrical positions with respect to the center O—O (FIG. 5). Each first oil damper 64 is formed of a cylinder 64a, a cylinder-side joint 64b, a piston 64c and a piston-side joint 64d. The cylinder-side joint 64b is fixed to the forward end of the cylinder 64a, with respect to the moving direction D1, and is joined to the coupling plate 63 via a pin. The piston-side joint 64d is fixed to the rear end, with respect to the moving direction D1, of the piston 64c, and is joined to the coupling plate 65a which is described in greater detail below.

The first shaft 65 is rotatably supported at its opposite ends by shaft carrying members 66. The shaft carrying members 66 are fixed to the bottom surface of the support plate 61. As shown in FIGS. 5 and 7, the two coupling plates 65a extend upward from the laterally middle portion of the first shaft 65. The coupling plates 65a are symmetrical with respect to the center O—O, and are non-rotatably fixed to the first shaft 65. As shown in FIG. 7, each coupling plate 65a is provided at its upper portion with an aperture, which is offset from the center of the first shaft 65 and is used for pin-connection to the piston-side joint 64d of the first oil damper 64. A first gear 67 and the first arm 68 are fixed to a portion of the first shaft 65 laterally outside the shaft carrying member 66.

The first arm 68 is fixed at a pivot end thereof to the end of the first shaft 65, and extends to a position behind the front wheel 4 as shown in FIG. 6. A third shaft 72 connects distal ends of the left and right first arms 68 together, and therefore rotates with the first arms 68 when the pivot occurs (as is explained in greater detail below). The first engagement members 73 are made of, for example, rubber and are fixed to portions of the third shaft 72 near opposite, distal ends thereof.

Each first engagement member 73 has a larger outer diameter than the third shaft 72. As shown in FIG. 6, the lower end of the first engagement member 73 is positioned slightly higher than the lowest portion of the front wheel 4 when the front wheel 4 is in contact with the floor and on level ground.

The second arm 71 has an end fixed to a second shaft 69, and extends in front of the front wheel 4 as shown in FIG. 6. The second shaft 69 is supported by the shaft carrying member 66. A second gear 70 is fixed to the second shaft 69, and is in mesh with the first gear 67 as shown in FIGS. 5 and 6. When the first arm 68 pivots or swings around the first shaft 65, the first shaft 65 rotates, and thereby the second shaft 69 is rotated via the first and second gears 67 and 70 so that the second arm 71 pivots around the second shaft 69. An example of the above pivoting is indicated by dotted line in FIG. 6. Conversely, when the second arm 71 pivots around the second shaft 69 to rotate the second shaft 69, the first shaft 65 is rotated via the second and first gears 70 and 67 so that the first arm 68 pivots around the first shaft 65. A fourth shaft 74 couples the other ends of the second arms 71 together, and are rotatably carried by the second arms 71. The second engagement members 75 made of, e.g., rubber are fixed to portions of the fourth shaft 74 near its opposite ends.

Each second engagement member 75 has a larger outer diameter than the fourth shaft 74. As shown in FIG. 6, the lower end of the second engagement member 75 is positioned slightly higher than the lowest portion of the front wheel 4 when the front wheel 4 is in contact with the floor.

When the first and second arms 68 and 71 pivot from the positions depicted by solid line in FIG. 6 to upper positions depicted by dotted line, the first shaft 65 rotates a corresponding amount, and the connection between the coupling plate 65 and the piston-side joint 64d causes both to move forward and downward. In response, the first oil damper 64 becomes inclined with respect to the horizontal, and the piston 64c moves with respect to the cylinder 64a. In this operation, the piston 64c is plunged into the cylinder 64a generating a resistance to the movement so that the rotation speed of the first shaft 65 and thus the moving speeds of the first and second arms 68 and 71 are damped.

With reference to FIGS. 8, 9, 10, 11, 12 and 13, the two rear wheels 5 are disposed at left and right rear sides of the cart 1, respectively. Each rear wheel 5 includes a fixed portion 51, a casing 52, a fifth shaft 53 and a tire 54.

The fixed portion 51 is fixed to the bottom surface of the second horizontal portion 21g of the main frame 21. The casing 52 is basically formed of a horizontal plate 52a, a first side plate 52b and a second side plate 52c.

Figure 10:
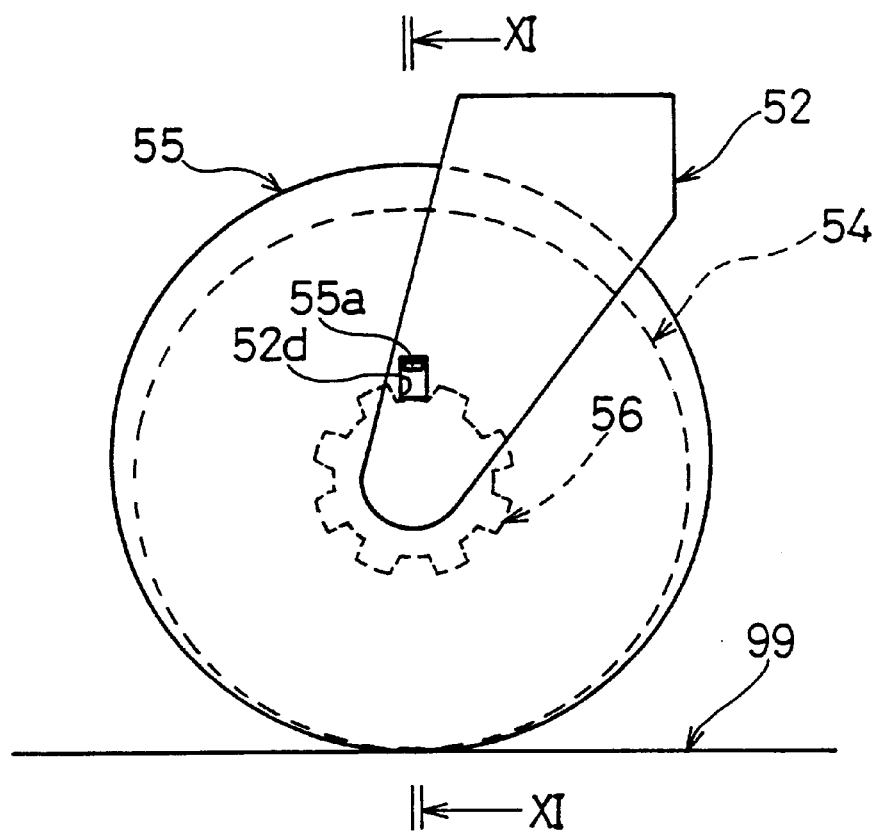
FIG. 10 shows an automatic brake mechanism connected to the rear wheel of the cart.
Figure 12:
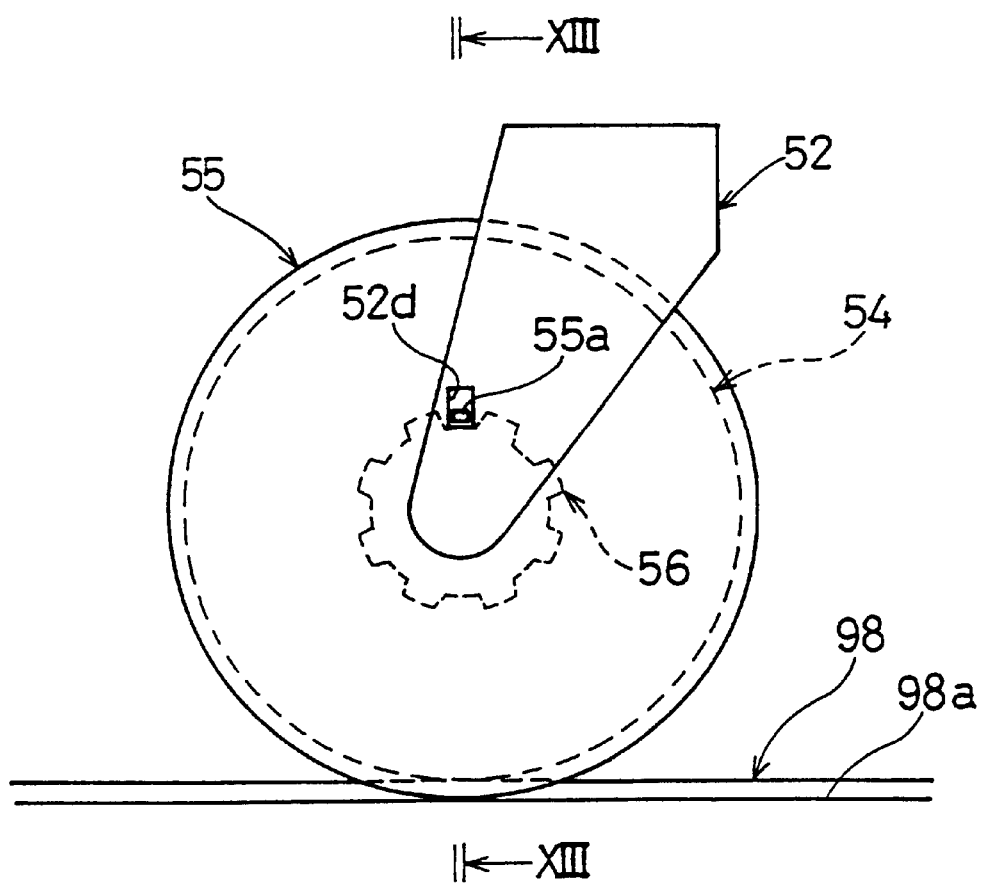
FIG. 12 shows the automatic brake mechanism in a braked state.

The horizontal plate 52a is fixed to the bottom surface of the fixed portion 51. The first side plate 52b extends downward and rearward from the outer end (lower end in FIG. 8) of the horizontal plate 52a, and the second side plate 52c extends downward and rearward from the inner end (upper end in FIG. 8) of the horizontal plate 52a. As shown in FIGS. 10 and 12, the first side plate 52b is provided with a rectangular aperture 52d. The first and second side plates 52b and 52c are provided at their lower ends with round apertures, respectively, in which the fifth shaft 53 is rotatably supported.

Figure 11:
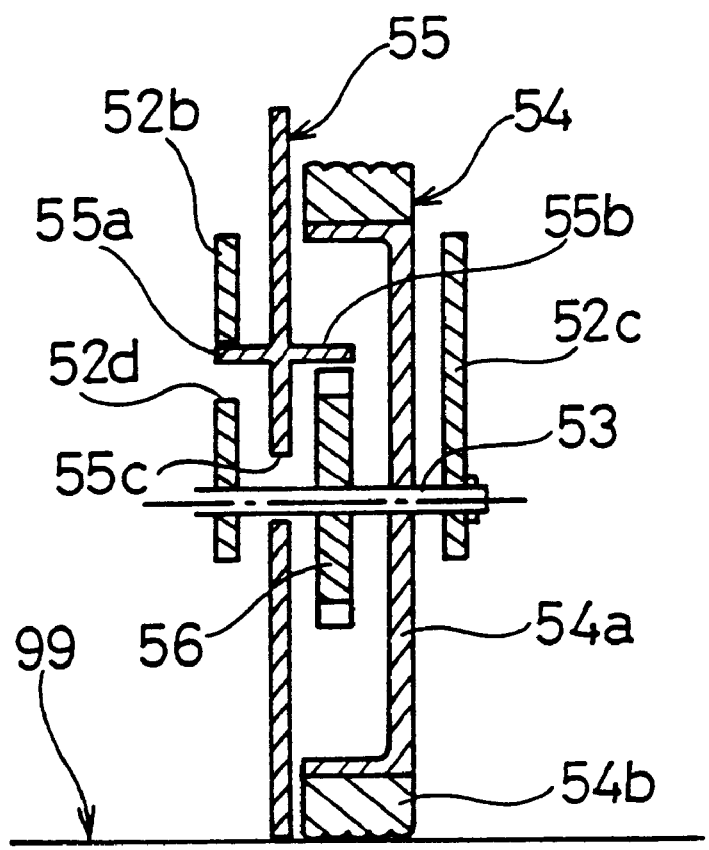
FIG. 11 is a cross section taken along line XI—XI in FIG. 10.
Figure 13:
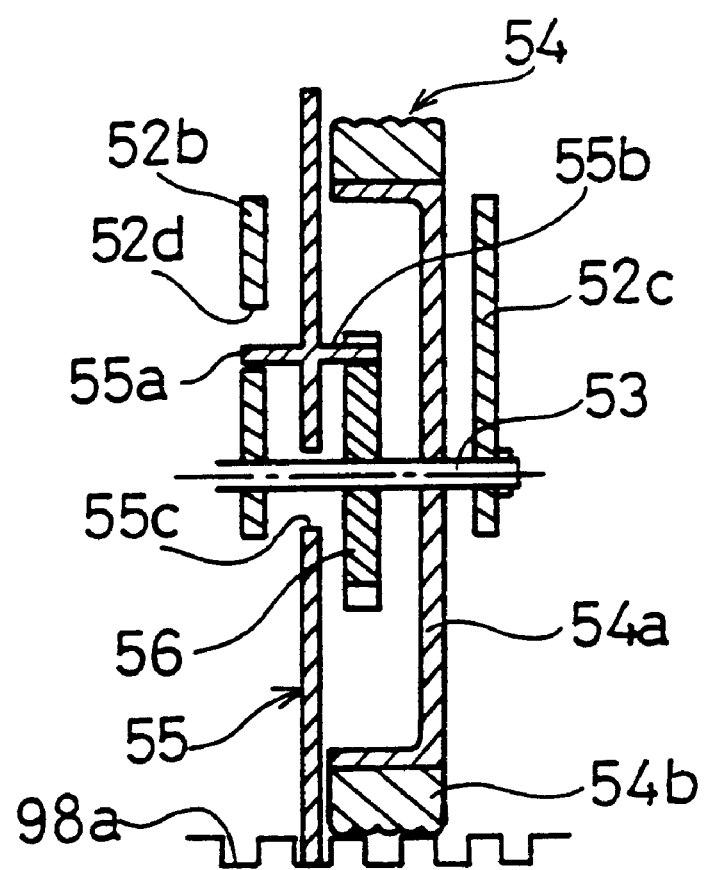
FIG. 13 is a cross section taken along line XIII—XIII in FIG. 12.

The tire 54 is fixed to a portion of the fifth shaft 53 between the opposite side plates 52b and 52c. The tire 54 is formed of a wheel portion 54a and a tire 54b as shown in FIGS. 11 and 13. The wheel portion 54a has a circular plate fixed at its center to the fifth shaft 53 and a cylindrical portion extending from the outer periphery of the circular plate toward the first side plate 52b. A lock gear 56 and an annular sensing plate 55 having an inner projection (described in greater detail below) are disposed in a space radially inside the cylindrical portion of the wheel portion 54a. The tire 54b is made of rubber, and is fixed to the outer peripheral surface of the cylindrical portion of the wheel portion 54a.

Figure 8:
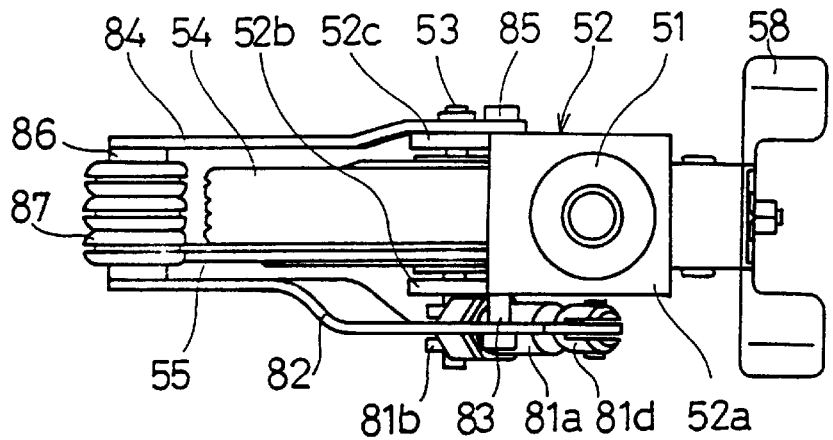
FIG. 8 is a top view of a rear wheel of the cart depicted in FIGS. 1–4 showing a rear-wheel-fall suppressing device.
Figure 9:
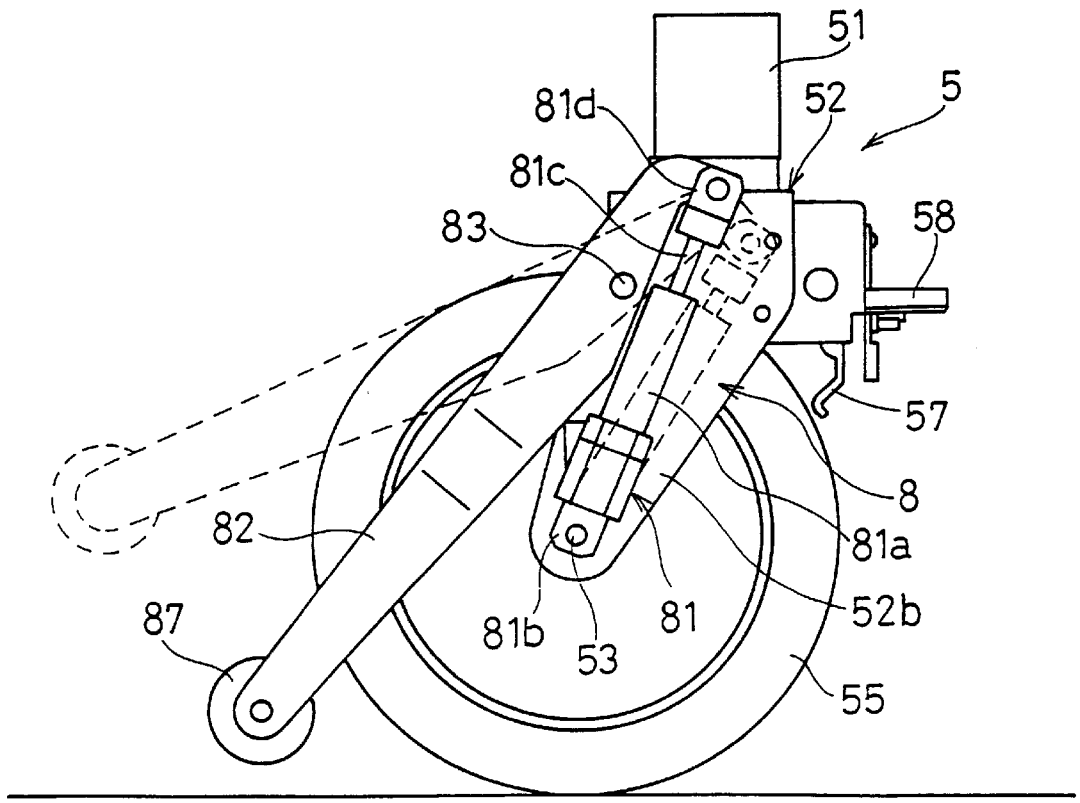
FIG. 9 is a side view of the rear wheel and the rear-wheel-fall suppressing device.

As shown in FIGS. 8 and 9, the rear-wheel-fall suppressing device 8 includes a second oil damper 81, a third outer arm 82, a third inner arm 84 and a third engagement member 87. As shown in FIG. 1, the outer side of the second oil damper 81 is covered by a rear wheel cover 9 fixed to the main frame 21.

The second oil damper 81 includes a cylinder 81a, a cylinder-side joint 81b, a piston 81c and a piston-side joint 81d. The cylinder-side joint 81b is fixed to the lower end of the cylinder 81a, and is rotatably coupled to a portion of the fifth shaft 53 outside the first side plate 52b. The piston-side joint 81d is fixed to one end of the piston 81c, and is coupled to the upper end of the third outer arm 82 via a pin.

The third outer arm 82 has one end coupled to the piston-side joint 64d via a pin, and extends therefrom to a position behind the rear wheel as shown in FIG. 9. The other end of the third outer arm 82 carries an end of a sixth shaft 86. The third outer arm 82 is rotatably supported at an intermediate position thereof (strictly, a portion near the piston-side joint 81d) by the first side plate 52b via a pin 83. Therefore, the second outer plate 82 is rotatable around the pin 83.

The third inner arm 84 is rotatably supported, as shown in FIG. 8, by the second side plate 52c via a pin 85 coaxial with the pin 83. The other end of the third inner arm 84 carries an end of the sixth shaft 86. The sixth arm 86 is provided for coupling the ends of the third outer arm 82 and third inner arm 84 together, and extends laterally and horizontally. The third engagement member 87 made of, e.g., rubber is fixed around a central portion of the six shaft 86.

The third engagement member 87 has an outer diameter larger than the sixth shaft 86. As shown in FIG. 9, the lower end of the third engagement member 87 is positioned slightly higher than the lower end of the rear wheel 5 when the rear wheel 5 is in contact with the floor.

When the third outer arm 82 and the third inner arm 84 move from the position depicted by solid line in FIG. 9 to the position depicted by dotted line, the joint point between the third outer arm 82 and the piston-side joint 81d move forward and downward. Thereby, the second oil damper 81 is compressed as the piston 81c moves relative to the cylinder 81a thereby extending into the cylinder 81a. In this operation, the piston 64c and the cylinder 64a move relative to one another generating resistance so that the moving speed of the joint point between the third outer arm 82 and the piston-side joint 81d, and thus the moving speed of the third engagement member 87 are damped.

The automatic brake mechanism is provided for automatically restricting the rotation of the rear wheels 5 when the cart 1 moves onto the escalator and the rear wheels 5 are located on the step. The automatic brake mechanism includes the annular sensing plate 55 and the lock gear 56, i.e., gear for locking (see FIGS. 10–13).

The lock gear 56 has eight outer teeth, and is fixed at its inner periphery to the fifth shaft 53 as shown in FIGS. 10, 11, 12 and 13. The lock gear 56 is arranged laterally between the tire 54 and the first side plate 52b, and is located inside (to the right in FIGS. 11 and 13) the sensing plate 55.

The sensing plate 55 is disposed laterally between the tire 54 and the first side plate 52b. The sensing plate 55 is provided with an outer projection 55a projecting toward the first side plate 52b, an inner projection 55b projecting toward the tire 54 and an aperture 55c near its center. The aperture 55c is larger than the fifth shaft 53. The outer projection 55a extends into the rectangular aperture 52d in the first side plate 52b. The inner projection 55b extends to a position radially outside the lock gear 56. As shown in FIGS. 11 and 13, the fifth shaft 53 extends through the aperture 55c, thus allowing vertical movement of the sensing plate 55 with respect to the fifth shaft 53.

As shown in FIGS. 10 and 11, when the tire 54 is moving on an ordinary flat floor 99, the lowest portion of the sensing plate 55 contacts the floor as well. In this state, the outer projection 55a is located at an upper position in the rectangular aperture 52d, and the inner projection 55b is located above the outer ends of the teeth of the lock gear 56. Also, the fifth shaft 53 extends through a lower portion of the aperture 55c. In this state, the tire 54 and the lock gear 56 are not restricted against rotation by the sensing plate 55, and can rotate freely together with the fifth shaft 53 carried by the casing 52. When the tire 54 is moving on the ordinary floor 99, the automatic brake mechanism is inactive, and does not brake the rear wheel 5.

When the tire 54 is on the step of the escalator 98 as shown in FIGS. 12 and 13, the tire portion 54b of the tire 54 is wider than any of the grooves 98a formed on the step of the escalator 98. Therefore, the tire 54 rests on the uppermost surfaces of the step of the escalator 98 and does not fall into any of the groove 98a. The sensing plate 55, on the other hand, has a thickness smaller than the width of the groove 98a, and therefore falls into one of the grooves 98a. Thus, the sensing plate 55 moves downward relatively to the tire 54, lock gear 56 and first side plate 52b. Thereby, the outer projection 55a moves to a lower position in the rectangular aperture 52d, and the inner projection 55b moves into a space between the teeth of the lock gear 56. Also, the fifth shaft 53 extends through the upper portion in the aperture 55c. In this state, rotation of the lock gear 56 is restricted by the first side plate 52b via the inner and outer projections 55b and 55a. As the rotation of the lock gear 56 is restricted, rotation of the fifth shaft 53 and the tire 54 is also restricted. In this manner, the automatic brake mechanism operates to brake the rear wheel 5 when the tire 54 is on the step of the escalator 98.

The manual brake mechanism is a parking brake for the rear wheels 5, and is manually activated and released. This manual brake mechanism is basically formed of a friction brake member 57 and a selector level 58 (see FIGS. 8 and 9). By operating the selector lever 58, the friction brake member 57 can be selectively set to a position for frictional engagement with the tire and a position for releasing the friction engagement.

In this embodiment, the manual brake mechanism includes the selector lever 58 attached to the casing 52. However, the selector lever may be arranged near the hand of the operator. Also, the manual brake mechanism may be inter-connected with the handle 3.

The movement of the cart 1 on an ordinary floor is described below.

On the ordinary floor, the user (operator) of the cart 1 holds the handle 3 and pushes the cart 1. In this state, since the lower ends of the first, second and third engagement members 73, 75 and 87 are located slightly above the floor, only the front and rear wheels 4 and 5 are in contact with the floor while the cart 1 is being moved. For safety on the escalator, it is desired that the operator holds the appropriate portions of the handle 3, and particularly the longitudinally middle portions of the handle 3. Therefore, it is desired to arrange grips around the longitudinally middle portions of the handle 3, or provide caution or warning relating to positions of the operator and the cart 1 on the escalator, as is described below, for leading the operator to hold the longitudinally middle portions of the handle 3.

Operation of the cart 1 on a downward moving escalator is described below.

Figure 14:
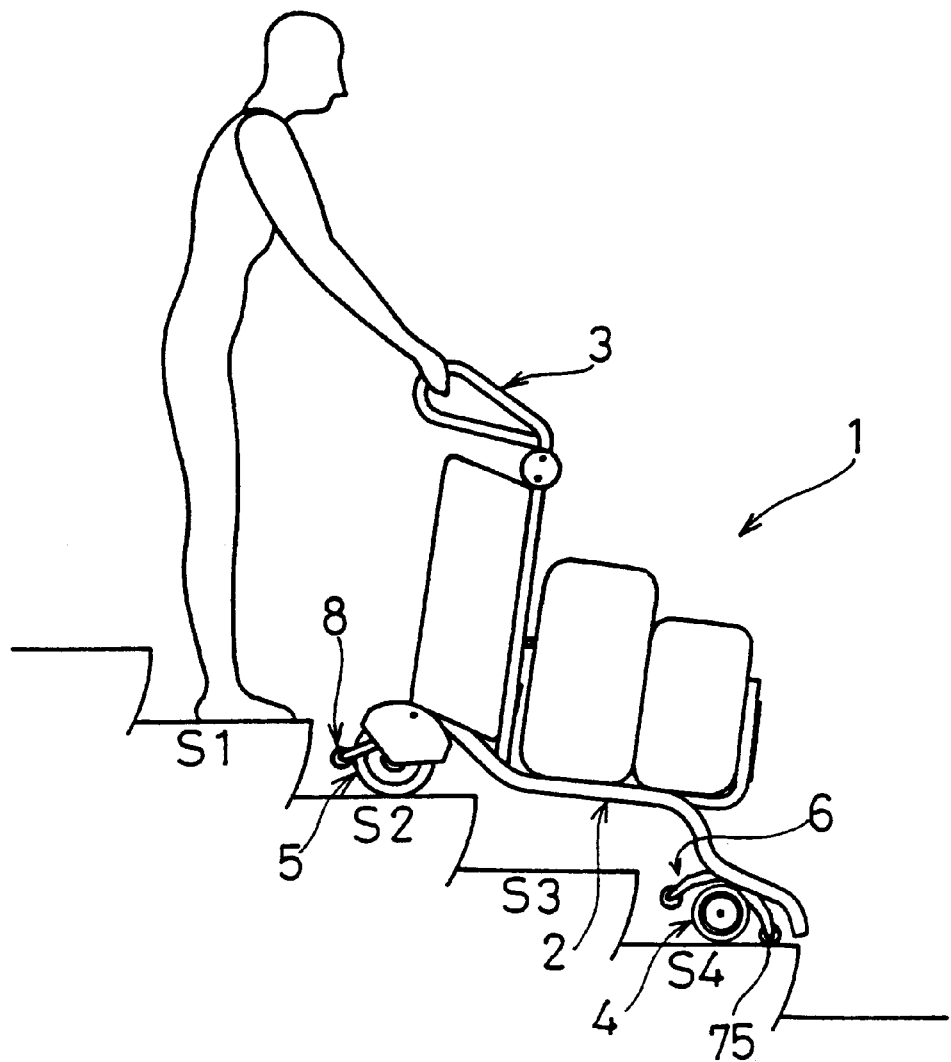
FIGS. 14 to 21 show the cart in various states of engagement with steps of an escalator.

When the front and rear wheels 4 and 5 are on the steps S2 and S4 of the down escalator as shown in FIG. 14, the automatic brake mechanism operates to restrict the rotation of the rear wheels 5 so that the cart 1 does not move back-and-forth. Thus, the cart 1 in the state shown in FIG. 14 is conveyed by the escalator without falling therefrom. When the front and rear wheels 4 and 5 are positioned on the longitudinally middle portions of the steps S2 and S4 as shown in FIG. 14, respectively, the second engagement member 75 is in contact with the front portion of the step S4 carrying the front wheel 4, and thereby auxiliary braking against forward and rearward movement of the cart 1.

Figure 15:
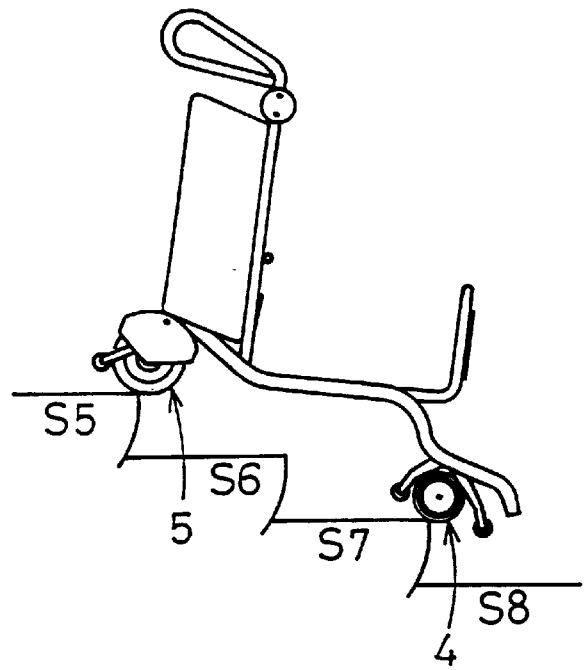

When the front and rear wheels 4 and 5 are located on or near forward edges of the steps of the down escalator, the cart 1 attains the state shown in FIG. 15 as the escalator begins to become inclined. Thereby, the cart 1 starts to fall toward the neighboring lower steps S6 and S8, and attains the state shown in FIG. 16. As this happens, the first and third engagement members 73 and 87 are first engaged with the steps S5 and S7 which previously carried the front and rear wheels 4 and 5. The cart 1 further falls while keeping the engagement of the first and third engagement members 73 and 87 with the steps S5 and S7, respectively, and the front and rear wheels 4 and 5 reach the neighboring lower steps S6 and S8, respectively (see FIG. 17). After the first and third engagement members 73 and 87 engage with the steps S5 and S7, respectively, the first and second oil dampers 64 and 81 damp the relative moving speed of the cart body 2 with respect to the first and third engagement members 73 and 87 so that the falling speed of the cart 1 decreases. This reduces operator's uneasiness and fear about falling of the cart 1 on the down escalator. Since the shock caused by the front and rear wheels 4 and 5 touching the next lower steps S6 and S8 is reduced, it is possible to suppress shifting and falling of baggage on the cart 1.

Operation of the cart 1 on an upward moving escalator 1 is described below.

Figure 18:
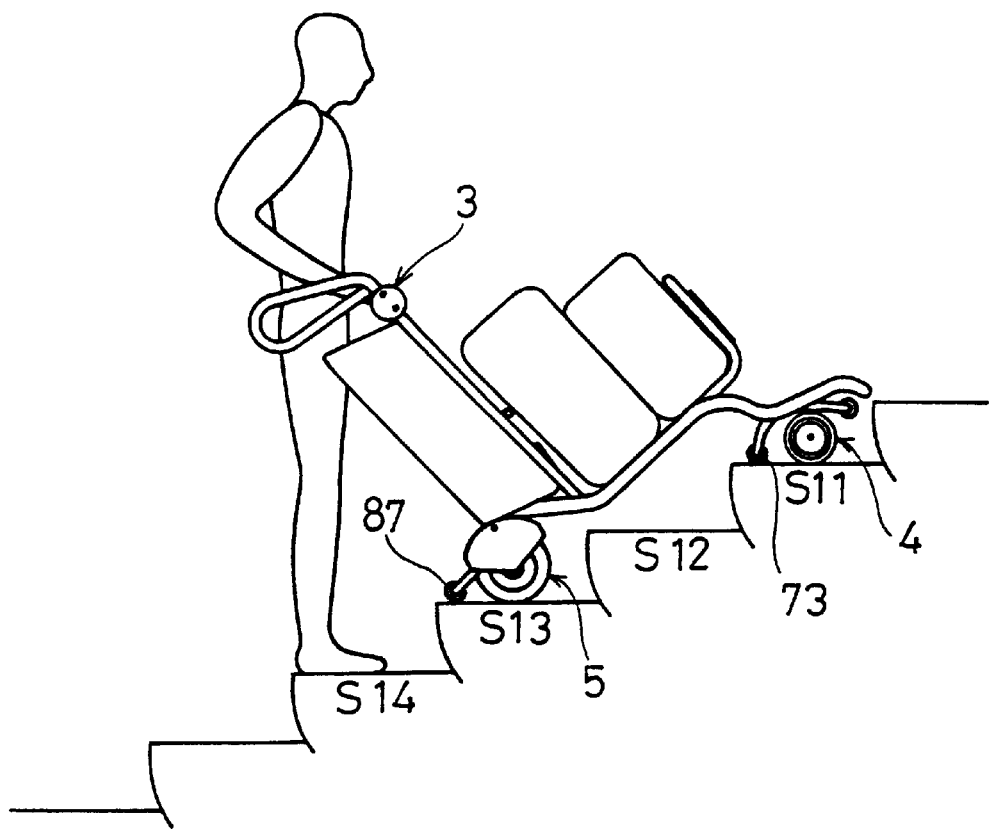

When the front and rear wheels 4 and 5 are on the steps S11 and S13 of the up escalator as shown in FIG. 18, the automatic brake mechanism operates to restrict the rotation of the rear wheels 5 so that the cart 1 does not move back-and-forth. Thus, the cart 1 in the state shown in FIG. 18 is conveyed by the escalator without falling therefrom. When the front and rear wheels 4 and 5 are positioned on the longitudinally middle portions of the steps S11 and S13 as shown in FIG. 18, respectively, the first and third engagement members 73 and 78 are in contact with the rear portions of the steps S11 and S13 carrying the front and rear wheels 4 and 5, respectively, and thereby restricting the forward and rearward movement of the cart 1 in addition to the automatic brake mechanism (FIG. 13).

Figure 19:
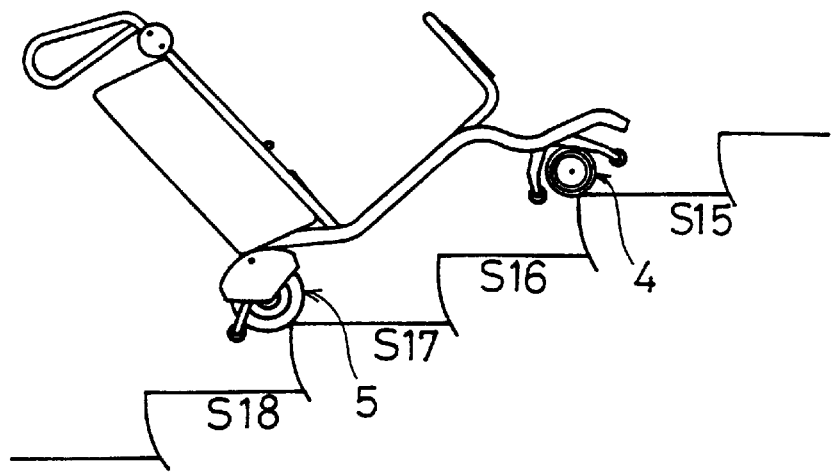
Figure 21:
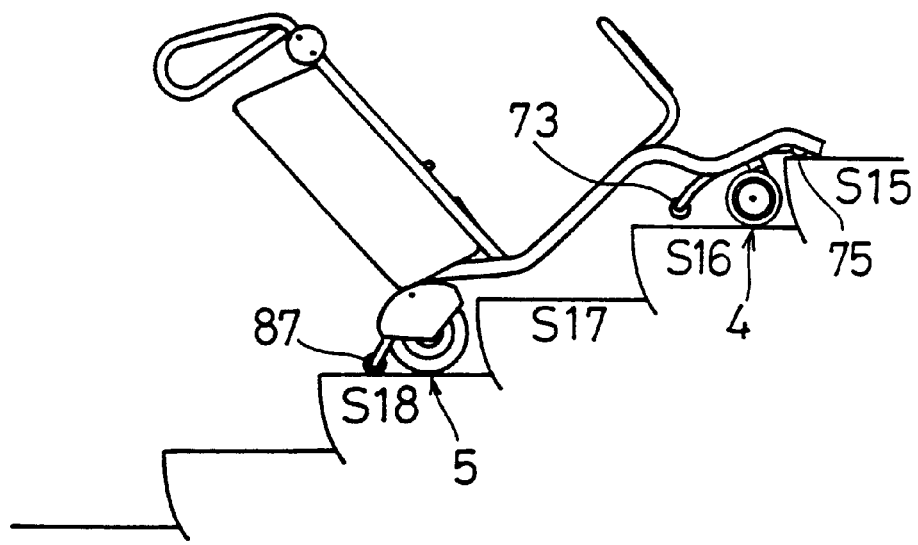

When the front and rear wheels 4 and 5 are located on rear edges of the steps of the up escalator, respectively, the cart 1 attains the state shown in FIG. 19 when the inclination of the escalator increases. Thereby, the cart 1 starts to fall toward the neighboring lower steps S16 and S18, and the second engagement member 75 engages with the step S15 previously carrying the front wheel 4. At the same time, the third engagement member 87 comes into contact with the neighboring lower step S18. The cart 1 further falls while keeping the engagement of the second engagement member 75 with the step S15. As shown in FIG. 21, the front and rear wheels 4 and 5 come into contact with the neighboring lower steps S16 and S18, respectively. After the second engagement member 75 engages with the step S15, the first oil damper 64 damps the relative moving speed of the cart body 2 with respect to the second engagement member 75 so that the falling speed of the cart 1 decreases. This reduces operator's uneasiness and fear about falling of the cart 1 on the upward moving escalator, and also suppresses shifting and falling of baggage. The second oil damper 81 reduces the falling speed of the rear wheels 5 and the rear portion of the cart 1.

Description is now given on other advantageous effects of the cart 1 according to the present invention when riding on an escalator.

(1) According to the cart 1 of the above described embodiment, the engagement members 73, 75 and 87 supported by the arms 68, 71, 82 and 84 move along arc-shaped paths defined about joints of the arms 68, 71, 82 and 84 as they pivot with respect to the cart body 2. When the engagement members 73, 75 and 87 contact the steps, therefore, the falling or downward motion of the cart 1 is in a circular motion in contrast to a mere falling motion or a mere downward sliding motion. Accordingly, the operator can feel that the motion of the cart 1 is a predetermined and expected motion, and uneasiness experienced by the operator when the cart 1 moves from one step to a lower step is suppressed.

Figure 16:
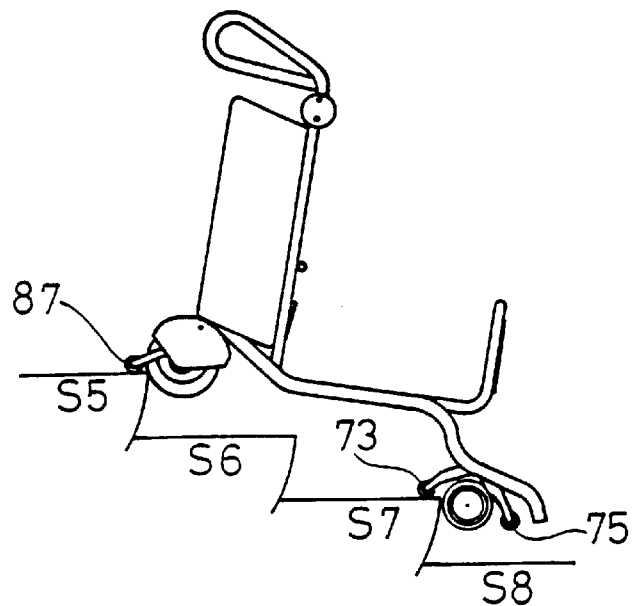
Figure 17:
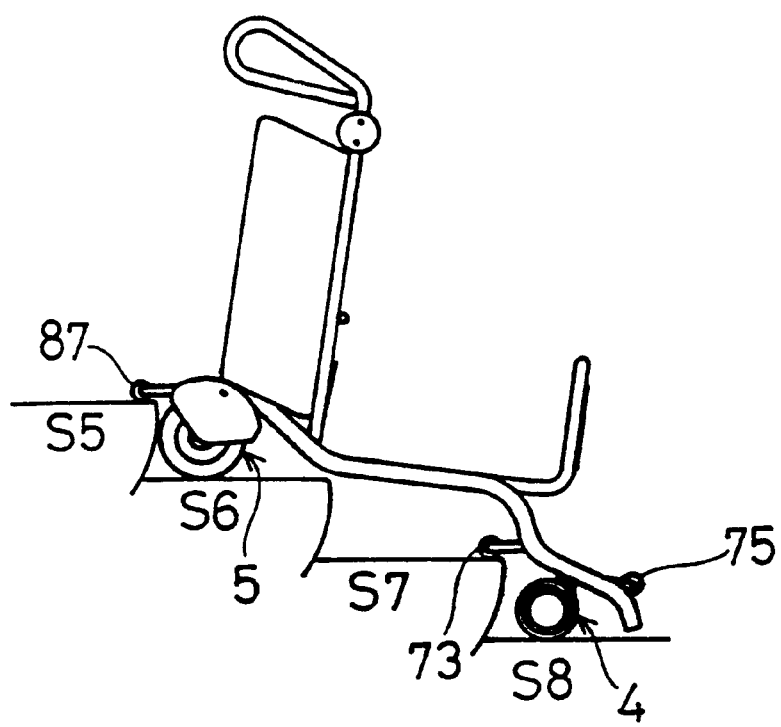

(2) Suppose when the cart 1 on a descending escalator falls from the position shown in FIG. 16 to the position shown in FIG. 17, and the second engagement member 75 comes into contact with the neighboring lower step S8 prior to the front wheel 4 (assuming the engagement member 75 is not in a raised position). In this case, a jolt is felt as a result of the second engagement member 75 contacting the step s8. Further, there is a jolt felt as the front wheel 4 touches the step s8, and therefore the cart 1 moves in an awkward manner when touching the step, which increases uneasiness experienced by the operator.

However, in the embodiment described above, the first and second engagement members 73 and 75 are interlocked with each other via the first and second gears 67 and 70 meshing with each other. Therefore, the second engagement member 75 moves to a position higher than the surface of the step S8 when the front wheel 4 touches the step S8 (see FIG. 17). Thereby, the cart 1 moves in a simple manner, which suppresses uneasiness of the operator.

Figure 20:
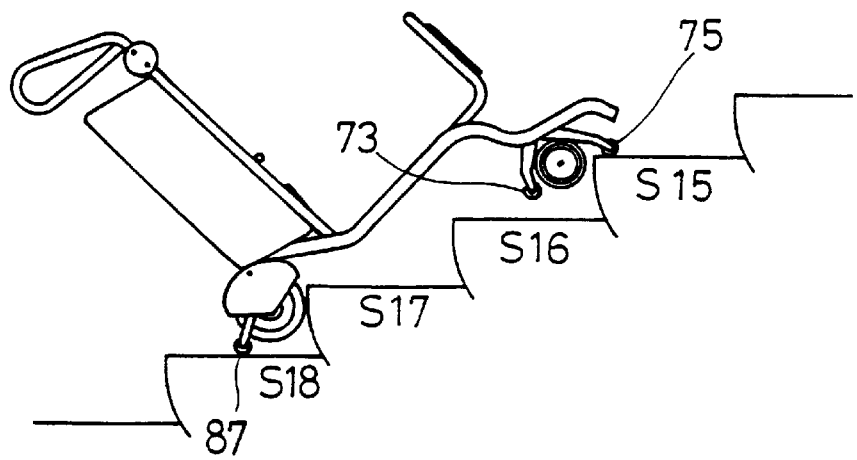

The same is true with respect to the case wherein the cart 1 on an ascending escalator and falls from the position shown in FIG. 20 to the position shown in FIG. 21. In this case, the front wheel 4 touches the neighboring lower step S16 before the first engagement member 73 touches the step S16.

(3) In the embodiment, each of the engagement members 73, 75 or 87 is disposed on each of the left and right sides. Therefore, even if the cart 1 is moved onto the escalator in a direction which is inclined with respect to the moving direction of the escalator to some extent, the probability is high that at least one of the engagement members 73, 75 and 87 engages with the step. Thus, the fall suppressing devices 6 and 8 are designed to be activated reliably even if the cart 1 is inclined around a vertical axis when moving onto the escalator.

(4) In the above described embodiment, the front and rear wheels 4 and 5 are longitudinally spaced apart from one another by a distance equal to double the span between the steps of the escalator.

If the above distance were to be determined independently of the span between the steps of the escalator, a difference occurs between the time when the first engagement member 73 engages with the step after start of falling of the front wheel 4 on a descending escalator and the time when the third engagement member 87 engages with the step after start of falling of the rear wheel 5. If this difference in time occurs, one of the first and third engagement members 73 and 87 engages with the step after start of falling of the cart 1, and thereafter the other engages with the step. Thus, the cart 1 moves in a complicated manner, which increases uneasiness of the operator.

In this embodiment, however, because the front and rear wheels are spaced apart from one another by a distance that is a multiple of the span between adjacent steps of the escalator, the front wheel 4 and the rear wheel 5 start to fall at about the same time, and the first engagement member 73 engages with the step S7 substantially at the same time as the third engagement member 87 engages with the step S5 (see FIG. 16). Therefore, the cart 1 moves with simple motion to the next adjacent step lever thus suppressing uneasiness of the operator.

(5) The cart 1 of the present invention is provided with the automatic brake mechanism, which is automatically activated upon engagement with the escalator, in addition to the manual brake mechanism which is the same as that conventionally employed in a cart for an airport. Therefore, when the cart 1 moves onto the escalator, the brake is automatically applied independently of the operation by the operator. This increases the stability of the cart 1 on the escalator.

(6) The present invention employs the handle 3, in which the second handle portions 32 extend rearward from the opposite ends of the first handle portion 31. Therefore, the operator pushing the cart 1 can be position in a space which is surrounded on three sides by the first handle portion 31 and the second handle portions 32.

On an ordinary floor, the operator holds the longitudinally middle portions of the second handles 32. On the down escalator, the operator holds the longitudinally rear end portions of the second handles 32. On the up escalator, the operator holds the longitudinally front end portions of the second handles 32 or the first handle portion 31. By changing the position of the hands on the handle 3 in this manner, it is not necessary that the operator moves on the steps of the escalator even when the handle 3 moves toward or away from the operator (see FIGS. 14 and 17). Since the operator can be positioned between the left and right second handle portions 32, the operator can stably hold appropriate portions of the second or first handle portion(s) 32 or 31 even when the handle 3 moves longitudinally with respect to the operator.

As described above, the operator is not required to move on the steps of the escalator, the safety of the operator on the escalator is improved, and fear and uneasiness of the operator can be reduced.

In this embodiment, the upper portion 32a of the second handle portion 32 extends rearward and upward. Therefore, the longitudinally rear end portion of the second handle portion 32 can be positioned at the level closer to the operator when traveling on a descending escalator (see FIG. 14). Accordingly, even when the handle 3 relatively moves forward and downward from the operator due to the downward inclination, the operator holding the second handles 32 can keep a natural posture.

(7) In the present invention, as shown in FIGS. 14 to 21, the configurations, sizes and inclinations of the frames of the cart body 2 are appropriately determined so that a space is always kept between the cart body 2 and the escalator. More specifically, the fourth inclined portion 21e of the main frame 21 and the bottom support portion 23a of the carrier lower frame 23 are inclined upward to locate their front portions higher than the rear portions when the cart 1 is on the floor. Owing to this inclination, a predetermined space is kept between the cart body 2 and the escalator while keeping the centroid of the whole cart at a low level.

Owing to this, it is possible to prevent such a motion that the cart 1 comes into contact with the edge or corner of the step and seesaws around the contact point on the edge when the inclination of the escalator appears, or disappears at the vicinity of the exit. Therefore, it is possible to avoid extra uneasiness which may be experienced by the operator by the seesaw motion.

The fourth inclined portion 21e of the main frame 21 and the bottom support portion 23a of the carrier lower frame 23, which are in contact with the bottom of a baggage, are inclined upward to locate their front portions higher than the rear portions when the cart 1 is on the floor. Therefore, moving, shifting and dropping of baggage can be suppressed particularly when the cart 1 is inclined on a descending escalator (see FIG. 14).

(8) In the present invention, the main frame 21 serving as the lower member of the cart body 2 serves also as the lower member of the carrier. This simplifies the structure, and facilitates the assembling process. Also, the parts are reduced in number, and the manufacturing cost is reduced.

According to the present invention, the damper damps the relative moving speed between the vehicle and the engagement member engaging with a surface of the steps of the escalator. Therefore, the falling speed of the vehicle is reduced, and the operator's uneasiness and fear about movement of cart are reduced. Also, shift and drop of the baggage on the vehicle can be suppressed.

According to another aspect of the invention, the predetermined space is kept between the escalator and the cart body on the same. Therefore, it is possible to avoid a seesaw motion which may cause uneasiness in the user of the cart.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A cart configured to ride on ascending and descending escalators after being moved onto the escalator, said cart comprising:
    a cart body;
    a plurality of wheels supported at lower portions of said cart body;
    a fall suppressing device having
        a first engagement member coupled to said cart body proximate a rearward side of at least one of said wheels for pivotal movement with respect to said cart body, said first engagement member biased into a position that is slightly spaced from a floor with said wheels in general level contact with the floor,
        a second engagement member coupled to said cart body proximate a forward side of at least one of said wheels for pivotal movement with respect to said cart body, said second engagement member biased into a position that is slightly spaced from the floor with said wheels in general level contact with the floor, said first and said second engagement members configured to pivot in opposite directions, and
        a damper coupled between said cart body and said first and second engagement members for dampening movements of both said first and second engagement members with respect to said cart body.

2. The cart according to claim 1, further comprising a first arm pivotally mounted to said cart body, said first engagement member fixed to a distal end of said first arm, wherein
    said first engagement member is movable relatively to said cart body along an arc-shaped path defined by pivotal movement of said first arm with respect to said cart body.

3. The cart according to claim 1, wherein said first and second engagement members are interlocked such that movement of said first engagement member causes said second engagement member to undergo corresponding movement.

4. A cart configured to ride on ascending and descending escalators after being moved onto the escalator, said cart comprising:
    a cart body;
    front wheels and rear wheels supported at lower portions of said cart body;
    a front-wheel-fall suppressing device that includes:
        a first arm coupled to said cart body proximate a rearward side of one of said front wheels for pivotal movement with respect to said cart body,
        a second arm coupled to said cart body proximate a forward side of said one of said front wheels for pivotal movement with respect to said cart body,
        a first engagement member fixed to a distal end of said first arm,
        a second engagement member fixed to a distal end of said second arm, and
        a damper having a first end fixed to said cart body proximate said one of said front wheels,
        said first and second engagement members biased into a position that is slightly spaced from a floor with said front and rear wheels in generally level contact with the floor, said first and said second engagement members configured to pivot in opposite directions, said damper is coupled between said cart body and said first and second engagement members for dampening movement of said first engagement member with respect to said cart body, and
        said first and second engagement members are interlocked such that movement of said first engagement member causes said second engagement member to undergo corresponding movement.

5. The cart according to claim 4, wherein said front and rear wheels are formed apart such that said front and rear wheels are adapted to engage with different steps of the escalator.

6. A cart configured to ride on ascending and descending escalators after being moved onto the escalator, said cart comprising:
    a cart body;
    front wheels and rear wheels supported at lower portions of said cart body;
    front-wheel-fall suppressing device that includes:
        a first arm coupled to said cart body proximate a rearward side of one of said front wheels for pivotal movement with respect to said cart body,
        a second arm coupled to said cart body proximate a forward side of said one of said front wheels for pivotal movement with respect to said cart body,
        a first engagement member fixed to a distal end of said first arm,
        a second engagement member fixed to a distal end of said second arm, and
        a damper having a first end fixed to said cart body proximate said one of said front wheels,
        said first and second engagement members biased into a position that is slightly spaced from a floor with said front and rear wheels in generally level contact with the floor, said damper is coupled between said cart body and said first and second engagement members for dampening movement of said first engagement member with respect to said cart body; and
    a rear-wheel-fall suppressing device having a third arm fixed to said cart body, a third engagement member fixed to a distal end of said third arm and a second damper fixed to said cart body and an other end of said third arm, said third arm being located at a rearward side of one of said rear wheels, said third engagement member being spaced from the floor with said front and rear wheels in generally level contact with the floor, said second damper being configured to dampen relative movement between said third engagement member and said cart body, said first and second engagement members being interlocked such that movement of said first engagement member causes said second engagement member to undergo corresponding movement.

7. The cart according to claim 6, further comprising a second rear-wheel-fall suppressing device and a second front-wheel-fall suppressing device, said rear-wheel-fall suppressing device and said front-wheel-fall suppressing device being disposed on a first side of said cart body and said second rear-wheel-fall suppressing device and said second front-wheel-fall suppressing device being disposed on a second side of said cart body.

8. A cart to be moved up or down by an escalator after being moved onto the escalator comprising:

a cart body;

a plurality of wheels arranged at a lower portion of said cart body; and a fall suppressing device having first and second engagement members and a damper, said first and second engagement members supported on said cart body at a rearward side of one of said wheel and in front of said one of said wheels, respectively, said first and second engagement members are spaced apart from a floor with said wheels in generally level contact with the floor, said engagement members being movable with respect to said cart body, said first and said second engagement members configured to pivot in opposite directions, said first and second engagement members are interlocked such that movement of said first engagement member causes said second engagement member to undergo corresponding movement, said damper configured to dampen the movement of both said first and second engagement members with respect to said cart body, and said cart is adapted to be moved onto the escalator such that a predetermined space is maintained between the cart body and the escalator.

9. The cart according to claim 8, wherein said cart body further comprises a lower member and a carrier for carrying baggage, said carrier being coupled to said lower member of said cart body at a bottom portion thereof.

10. The cart according to claim 9, wherein said lower member includes an inclined portion that extends frontward and upward.

11. The cart according to claim 1, further comprising a manual brake mechanism configured to brake rotation of at least one of said wheels, and an automatic brake mechanism automatically controlling at least one of said wheels that is adapted to contact a step surface of the escalator.

12. The cart according to claim 11, wherein said automatic brake mechanism includes a sensing plate formed with an axially extending protrusion and a locking gear connected to one of said wheels, said sensing plate being configured for contact with a level floor surface with said cart engaged on the level floor surface, and said sensing plate being configured for engagement in a groove formed on the step surface of the escalator with said cart engaged on the step surface of the escalator, wherein, in response to said sensing plate being engaged in the groove formed on the step surface, said protrusion is engageable with interlocking gear teeth formed on said locking gear thus restricting rotation of said one of said wheels.

13. The cart according to claim 12, wherein said one of said wheels is supported on a shaft, said sensing plate is formed with a central aperture through which said shaft extends, said central aperture being larger than a diameter of said shaft.

14. The cart according to claim 13, wherein said cart body includes a support plate fixed thereto, said support plate being formed with an opening proximate said one of said wheels, said sensing plate is formed with a second protrusion which extends through said opening in said support plate, such that engagement between said second protrusion and said support plate prevents rotation of said sensing plate.

15. The cart according to claim 11, wherein said automatic brake mechanism includes a sensing plate formed with a first and second protrusion and a locking gear connected to one of said wheels, said sensing plate being movably attached to said cart body proximate said one of said wheels, said cart body includes a support plate fixed thereto, wherein, in response to said sensing plate being engaged a groove formed on the step surface of the escalator with said cart engaged on the step surface of the escalator, said first protrusion is engageable with interlocking gear teeth formed on said locking gear and said second protrusion extends through said opening in said support plate, such that engagement between said second protrusion and said support plate prevents rotation of said sensing plate, thus restricting rotation of said one of said wheels.

16. The cart according to claim 15, wherein said one of said wheels is supported on a shaft, said sensing plate is formed with a central aperture through which said shaft extends, said central aperture being larger than a diameter of said shaft.

* * * * *